United States Patent

Matsuzaki et al.

[11] 3,805,278
[45] Apr. 16, 1974

[54] ELECTRONIC SHUTTER MEANS FOR PHOTOGRAPHIC CAMERAS

[75] Inventors: Soichiro Matsuzaki; Isao Kondo, both of Tokyo, Japan

[73] Assignee: Olympus Optical Co., Ltd., Tokyo-to, Japan

[22] Filed: June 5, 1973

[21] Appl. No.: 367,227

[30] Foreign Application Priority Data
June 7, 1972  Japan............... 47-56630

[52] U.S. Cl. ............................................. 354/33
[51] Int. Cl. ............................................. G03b 7/08
[58] Field of Search ..................... 95/10 CT

[56] References Cited
UNITED STATES PATENTS
3,245,332   4/1966   Kagan................... 95/10 X
3,326,103   6/1967   Topaz..................... 95/10

Primary Examiner—Samuel S. Matthews
Assistant Examiner—Michael L. Gellner
Attorney, Agent, or Firm—Cushman, Darby & Cushman

[57] ABSTRACT

An electronic shutter means for photographic cameras provided with two time limiting circuits capable of limiting the exposure time decided by the light measuring circuit to a value within the range between the exposure time required for achieving perfect synchronization of the shutter operation to light emission of the flash lamp and the exposure time with which camera-shake can be prevented.

3 Claims, 2 Drawing Figures

FIG. I

ELECTRONIC SHUTTER MEANS FOR PHOTOGRAPHIC CAMERAS

BACKGROUND OF THE INVENTION

1. Field of the invention

The present invention relates to electronic shutters for photographic cameras and, more particularly, to an electric shutter means arranged being capable of deciding the time of exposure by actuating the light measuring circuit even in flash photographing.

2. Description of the prior art

Generally, a focal plane shutter is arranged to expose the film as the front and rear curtains (front and rear blades) run in turn in longitudinal or cross direction just in front of the film charged in the camera. Therefore, when the shutter speed is higher than a certain value, the film is exposed by a slit formed by said pair of curtains or blades. Consequently, at the time of flash photographing with this type of shutter, the shutter speed to be set is limited in order to achieve perfect synchronization. Though this limit is decided according to the construction of each shutter, it is usually 1/125 second, 1/80 second or 1/60 second.

On the other hand, a focal plane type electronic shutter is generally arranged so that the exposure is automatically decided by the light measuring circuit according to the diaphragm aperture to be set and brightness of the object. Therefore, if the light measuring circuit is activated at the time of flash photographing, the flash photographing becomes practically impossible as the film is exposed at a speed higher than the above-mentioned limit. To solve this problem, this type of conventional electronic shutters have been arranged to perform flash photographing at the above-mentioned pre-determined limit value of shutter speed by changing over the light measuring circuit to inactive condition.

But, flash photographing at such pre-determined shutter speed has a disadvantage as described below. That is, when the object is at a short distance and brightness of the background is low, the diaphragm aperture becomes small and, consequently, underexposure occurs for the background though proper exposure can be achieved for the object itself. So, the photograph obtained becomes considerably unnatural. This disadvantage can be eliminated by the following arrangement. That is, by actuating the light measuring circuit even at the time of flash photographing, the electronic shutter is forced to work at the limit value of the shutter speed, i.e., the afore-mentioned predetermined value, when the exposure decided by the light measuring circuit is shorter than said limit value of the shutter speed required for perfect synchronization. When the exposure time measured by the light measuring circuit is longer than said limit value, the electronic shutter is operated by the shutter speed decided by the light measuring circuit. By this arrangement, the object is photographed by the flashlight and the background is photographed at the appropriate shutter speed decided by the light measuring circuit even when the background of the object is dark. Thus, it is possible to obtain a quite favourable photograph which cannot be considered to be taken by flash photographing. In this method, however, the exposure time decided by the light measuring circuit becomes extremely long when the background is very dark as in the case of photographing at outdoors at night. In an extreme case, the shutter is held open like the case of bulb photographing. For 35 mm single-lens reflex cameras in general, it is known that so-called camera-shake phenomenon occurs when photographing by holding the camera by hands if the shutter speed becomes lower than 1/80 second or 1/15 second. To solve this problem, cameras with electronic shutters in general are arranged to give a warning when the exposure time decided by the light measuring circuit becomes longer than the above-mentioned exposure time at which camera-shake tends to occur. As flash photographing is usually carried out under such unfavourable condition under which said warning has to be given, those cameras with electronic shutters have a disadvantage that camera-shake tends to occur when the light measuring circuit is activated in flash photographing as described in the above and the electronic shutter is operated at the exposure time decided by the light measuring circuit.

SUMMARY OF THE INVENTION

It is, therefore, the main object of the present invention to provide an electronic shutter for a photographic camera arranged to activate the light measuring circuit even at flash photographing in order to photograph also the background of the object with an appropriate exposure and, at the same time, to limit the shutter speed to a value within the range between the shutter speed required for perfect synchronization of the shutter speed to light emission of the flashlight and the shutter speed at which camera-shake can be prevented, thus to obtain a favourable photograph, even in flash photographing, like those taken with natural light.

Another object of the present invention is to provide an electronic shutter for a photographic camera arranged so that the time limiting circuits, which limit the shutter speed decided by the light measuring circuit to a value within a range between pre-determined two shutter speeds, is automatically put to the operable condition by the action to mount the flashlight device to the camera.

Other objects and advantages of the present invention will become evident by the following detailed description according to embodiments of the present invention illustrated in the accompanying drawings.

DETAILED DESCRIPTION OF THE PREFERRED EMBODIMENTS

Figure 1:
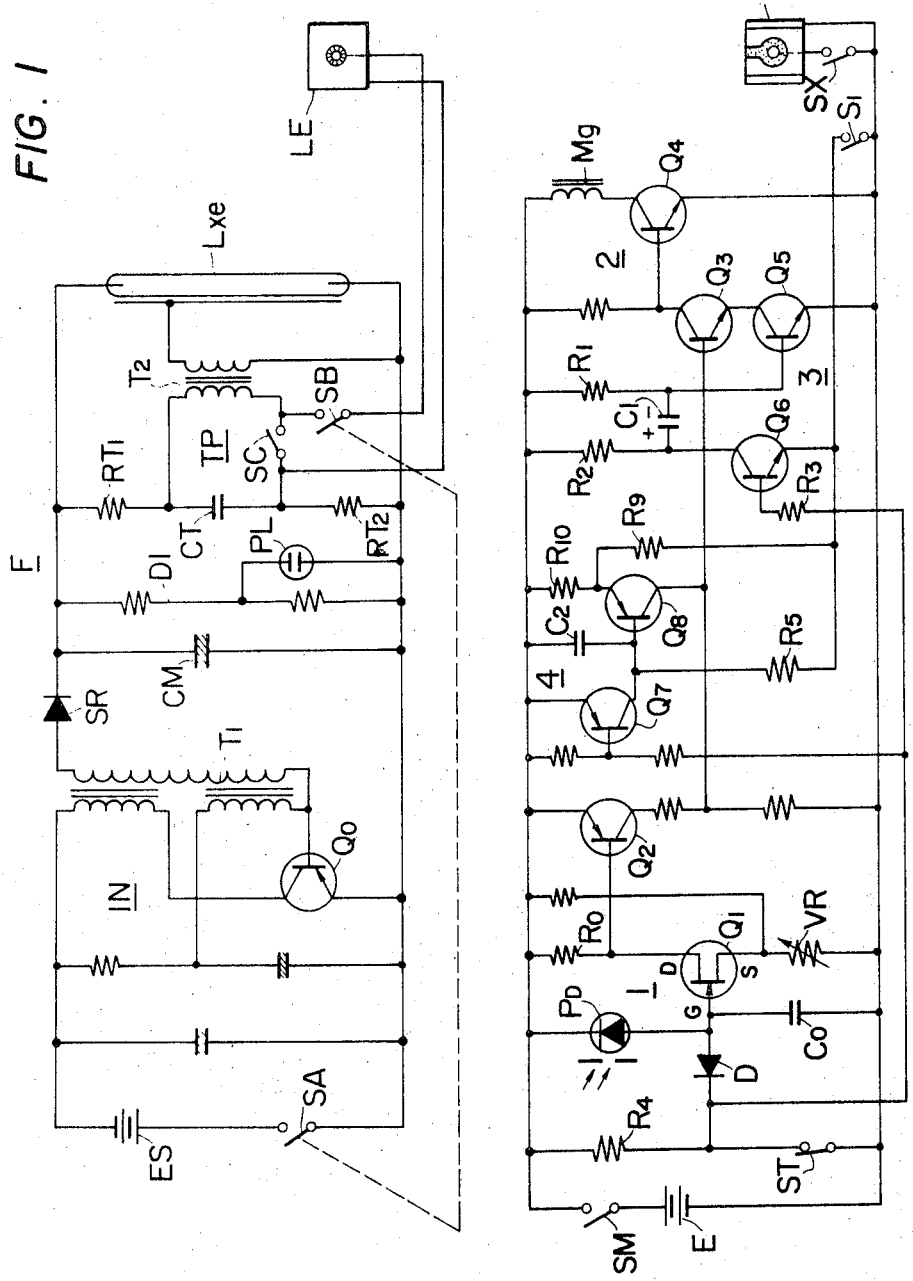
FIG. 1 shows a circuit diagram illustrating an embodiment of the electronic shutter means according to the present invention.

Referring to the embodiment shown in FIG. 1, a light measuring circuit 1 and electronic shutter operating circuit 2 are connected to a direct-current power source E through a power switch SM. The light measuring circuit 1 is arranged by an integration circuit comprising a phtoelectric element PD like a solar battery and a capacitor $C_0$ connected in series. The connecting point of the capacitor $C_0$ to said photoelectric element PD is connected to the gate G of a field effect transistor $Q_1$ (hereinafter called FET) of which the drain D is connected to said power source E through a resistor $R_0$ and the source S is connected to said power source E through a variable resistor VR. It is arranged that the terminal voltage of the capacitor $C_0$ is imposed between the gate G and source S of said FET $Q_1$ through the variable resistor VR. Said electronic shutter operating circuit 2 comprises a PNP type transistor $Q_2$, of which the emitter and collector are connected to said power source E and the base is connected to the drain D of said FET $Q_1$, an NPN type transistor $Q_3$ concatenated to said transistor $Q_2$ and an NPN type transistor $Q_4$ concatenated to said transistor $Q_3$, and it is arranged that said transistors $Q_2$, $Q_3$ and $Q_4$ perform switching operation responding the drain voltage of FET $Q_1$. An electro-magnet Mg for controlling the closing operation of the electronic shutter is connected to the collector circuit of the transistor $Q_4$.

To said power source E, a time limiting circuit 3 for deciding the limit value of the shutter speed to realise perfect synchronization at the time of flash photographing (the shutter speed which can produce the fully opened condition of the photographing window for the focal plane shutter, for example, 1/125 second, 1/80 second or 1/60 second) and a time limiting circuit 4 for deciding the limit value of the shutter speed to prevent camera-shake (for example, 1/80 second or 1/15 second) are connected in series. Said time limiting circuit 3 comprises an NPN type transistor $Q_5$ having a collector connected to the emitter of the transistor $Q_3$ of said electronic shutter operating circuit 2 and a base connected to the power source E through a resistor $R_1$, an NPN type transistor $Q_6$ having a collector connnected to the power source E through a resistor $R_2$ and an emitter connected to the power source E through a switch $S_1$ for flash photographing and a capacitor $C_1$ connected between the base of the transistor $Q_5$ and collector of the transistor $Q_6$. The base of said transistor $Q_6$ is connected to said power source E through resistors $R_3$ and $R_4$. Said time limiting circuit 4 comprises a PNP type transistor $Q_8$, which is connected in parallel to the transistor $Q_2$ of said electronic shutter operating circuit 2, a capacitor $C_2$ connected between the base of said transistor $Q_8$ and power source E, a resistor $R_5$ connected to the power source E through the switch $S_1$ for flash photographing and to the base of said transistor $Q_8$, and a PNP type transistor $Q_7$ having an emitter connected to the power source E and a collector connected to the base of the transistor $Q_8$. Between both terminals of the capacitor $C_0$ of said light measuring circuit 1, a trigger switch ST, which is opened when the shutter opens being synchronized with the opening motion of the shutter, is connected in parallel through a diode D. By said switch ST, the base of the transistor $Q_6$ of the time limiting circuit 3 and base of the transistor $Q_7$ of the time limiting circuit 4 are to be respectively connected to the negative pole terminal of said power source E.

The circuit designated by the reference symbol F as a whole shown in FIG. 1 illustrates a discharge lamp type flash gun (Strobo flash gun). This flash gun is of the arrangement according to the known art and has a battery ES. From this battery ES, a direct current power is supplied, through a power switch SA, to the inverter IN, which comprises a transistor $Q_0$ and transformer $T_1$, converted to a high-tension alternating current by said inverter IN, rectified by a rectifier SR and is charged to a charge and discharge capacitor CM. To the charge and discharge capacitor CM, a xenon lamp $L_{xe}$ for emitting flashlight is connected and, at the same time, an indicating circuit DI comprising an indicating lamp PL for indicating the charged condition of the capacitor CM and a trigger pulse generating circuit TP are also connected in parallel. Said trigger pulse generating circuit TP is arranged as follows. That is, a trigger capacitor CT is connected in parallel to said charge and discharge capacitor CM by inserting resistors $RT_1$ and $RT_2$ in series on both ends of said trigger capacitor CT. The primary widing of a pulse transformer $T_2$ is connected to said trigger capacitor CT through a manual switch SC and the secondary winding of the pulse transformer $T_2$ is connected between one electrode of said xenon lamp $L_{xe}$ and the conductive member arranged adjacent to and along the xenon lamp $L_{xe}$. To said manual switch SC of the flash gun F, an X-contact SX, which closes when the shutter is fully opened, is connected in parallel through a flash shoe FS, a mounting leg LE of said flash gun F to be mounted to said shoe FS and a switch SB which co-operates with the power switch SA of said flash gun F.

The operation of the circuit shown in FIG. 1 is as described below.

When the power switch SM is closed by keeping the switch $S_1$ for flash photographing in opened condition, the time limiting circuits 3 and 4 are both kept in inactive condition because the emitter of the transistor $Q_6$ and resistor $R_5$ are in floating condition. But, the transistor $Q_5$ is put to ON condition because the base current becomes ready for flowing through the resistor $R_1$. Therefore, the electronic shutter operating circuit 2 becomes operable and performs an operation same as that of the known electronic shutter means co-operating with the light measuring circuit 1. That is the shutter can give an exposure to the film at the shutter speed which is decided by said light measuring circuit 1.

But, when said switch $S_1$ for flash photographing is closed, the shutter means performs the following operation. That is, when the power switch SM is closed at first by pushing down the shutter release button keeping said switch $S_1$ in closed condition, FET $Q_1$ in the light measuring circuit 1 is in OFF condition, and the transistor $Q_6$ is in OFF condition and the transistor $Q_5$ is in ON condition in the time limiting circuit 3, because the trigger switch ST is closed at that time. In the other time limiting circuit 4, the transistor $Q_7$ is in ON condition and the transistor $Q_8$ is in OFF condition in the same way. Therefore, the shutter operating circuit 2 responds the drain potential of said FET $Q_1$, the transistor $Q_2$ and transistor $Q_3$ are turned OFF, and the transistor $Q_4$ is turned ON. Consequently, a current is supplied to the electro-magnet Mg through the transistor $Q_4$ and said electro-magnet Mg is energized.

When said shutter release button is further pushed down to open the shutter, the trigger switch ST is opened being synchronized to it. When the trigger switch ST is thus opened, said light measuring circuit 1, time limiting circuits 3 and 4 begin their operation at the same time. That is, in the light measuring circuit 1, the solar battery PD generates a photoelectric current corresponding to the intensity of incident light to it, said phototelectric current flows to the capacitor $C_0$ and begins to charge the capacitor $C_0$. In the time limiting circuit 3, the transistor $Q_6$ is turned ON, and the terminal voltage of the capacitor $C_1$, which has been charged in the polarity as illustrated in the figure through the resistor $R_2$ and transistor $Q_5$, is imposed on said transistor $Q_5$ as a bias voltage through said transistor $Q_6$ in reverse direction, thus said transistor $Q_5$ is turned OFF. As a result, to said capacitor $C_1$, a charging current to charge it in the polarity reverse to that shown in the figure begins to flow through the resistor $R_1$ and transistor $Q_6$. In said time limiting circuit 4, the transistor $Q_7$ is turned OFF. Thus, the capacitor $C_2$ becomes chargeable and a charging current begins to flow to the capacitor $C_2$ through the resistor $R_5$. When the time T passes from the moment at which said light measuring circuit 1 started its operation, the terminal voltage of the capacitor $C_0$ reaches the trigger level of the FET $Q_1$ and FET $Q_1$ is turned ON. When FET $Q_1$ is turned ON, the shutter operating circuit 2 responds to it, and transistors $Q_2$ and $Q_3$ are turned ON.

In this case, the time T from the moment when the trigger switch ST is opened to the moment when said FET $Q_1$ is turned ON corresponds to the exposure time, which is decided according to the incident light value to said solar battery PD, i.e., brightness of the object, and the preset diaphragm aperture.

In said time limiting circuit 3, the terminal voltage of the capacitor $C_1$ reaches the trigger level of the transistor $Q_5$ when the time X second passes from the moment at which the time limiting circuit 3 started its operation, and the transistor $Q_5$ is turned ON. In this case, the time X until the transistor $Q_5$ is turned ON corresponds to the maximum limit of the shutter speed required for achieving perfect synchronization which is predetermined according to the construction of the shutter and other factors and is set to 1/125 second for example.

In the time limiting circuit 4, the terminal voltage of the capacitor $C_2$ reaches the trigger level of the transistor $Q_8$ when a time H second passed from the moment at which said time limiting circuit 4 started its operation, and the transistor $Q_8$ is turned ON. When the transistor $Q_8$ is turned ON, the condition of the time limiting circuit 4 becomes same as the case when the transistor $Q_2$ of said shutter operating circuit 2 is turned ON. Consequently, the transistor $Q_3$ is also turned ON accordingly. In this case, the time H corresponds to the minimum limit of the shutter speed required for preventing camera-shake phenomenon. This value is decided according to sizes of the camera and lens and is set, for example, to 1/15 second.

To sum up, the shutter operating circuit 2 works as follows according to the exposure time T which is decided by said light measuring circuit.

a. When the exposure time T decided by the light measuring circuit 1 is shorter than the time X decided by the time limiting circuit 3 (X > T):

When the time T second passes from the moment at which the shutter opening operation is performed at first, FET $Q_1$ in the light measuring circuit 1 is turned ON. So, the transistor $Q_2$ of the shutter operating circuit 2 is turned ON and the transistor $Q_3$ also tends to turn ON. At that moment, however, the transistor $Q_5$ is still in OFF condition and, therefore, the transistor $Q_3$ cannot be turned ON. Consequently, the transistor $Q_4$ is kept in ON condition and the electromagnet Mg is kept in energized condition. When the time X second passes from the moment at which the shutter opening operation is carried out, the transistor $Q_5$ of the time limiting circuit 3 is turned ON as described in the above. So, said transistor $Q_3$ is also turned ON and, therefore, the transistor $Q_4$ is turned OFF and the electro-magnet Mg is de-energized. As the electronic shutter begins its closing operation at the moment when the electro-magnet Mg is de-energized, the shutter speed in this case is consequently limited by the time X which is decided by the time limiting circuit 3.

b. When the exposure time T decided by the light measuring circuit 1 is longer than the time X decided by the time limiting circuit 3 and is shorter than the time H decided by the time limiting circuit 4 (X ≦ T ≦ H):

When the time X second passes from the moment at which the shutter opening operation is performed at first, the transistor $Q_5$ in the time limiting circuit 3 tends to turn ON, as described in the above, but is kept in operable condition because the transistor $Q_3$ is still in OFF condition at that moment. When the time T second passed from the moment at which the shutter opening operation is carried out, FET $Q_1$ of the light measuring circuit 1 is turned ON, and the transistor $Q_3$ is turned ON subsequently. Then, transistors $Q_3$ and $Q_5$ are turned ON at the same time. So, the transistor $Q_4$ is turned OFF, the electro-magnet Mg is de-energized, and the shutter closing operation is carried out. Consequently, the shutter speed in this case is limited by the exposure time T decided by the light measuring circuit 1 and the shutter is operated in the same way as photographing with an automatic exposure control (E.E.) in general.

c. When the exposure time T decided by the light measuring circuit 1 is longer than the time H decided by the time limiting circuit 4 (T > H):

When the time X second passes from the moment at which the shutter opening operation is carried out at first, the time limiting circuit 3 works as described in the above and the transistor $Q_5$ is kept operable. When the time H second passes from the moment at which the shutter opening operation is carried out, the transistor $Q_8$ in the time limiting circuit 4 is turned ON as described in the above, and the transistor $Q_3$ is turned ON subsequently. So, said transistors $Q_5$ and $Q_3$ are turned ON at the same time, the transistor $Q_4$ is turned OFF, the electro-magnet Mg is de-energized, and the shutter closing operation is carried out. Therefore, the shutter speed in this case is controlled by the time H decided by the time limiting circuit 4.

Furthermore, in flash photographing, the mounting leg LE of said flash gun F is mounted to the shoe FS of the camera and the power switch SA of the flash gun F is closed. Thus, the X-contact SX is closed at the same time when the front curtain of the electronic shutter is fully opened, the trigger pulse generating circuit TP works subsequently and the Xenon lamp $L_{xe}$ is flashed. Therefore, when the switch $S_1$ is closed as described in the above in flash photographing, the maximum speed of the electronic shutter is limited by the time X decided by the time limiting circuit 3. Thus, perfectly synchronized photographing can be performed without fail. When the exposure time T decided by the light measuring circuit 1 becomes longer than the time X decided by the time limiting circuit 3, i.e., when the object and its background are dark, the shutter speed of the electronic shutter is decided by the light measuring circuit 1. Therefore, both of the object and its background can be photographed with an adequate exposure, and it is possible to eliminate the disadvantage of the conventional flash photographing that the adequate exposure is achieved only for the object and the background is not photographed at all. Besides, as the minimum shutter speed of the electronic shutter is limited by the time H obtained by the time limiting circuit 4, it is possible to eliminate the inconvenience that the shutter speed becomes extremely low and camera-shake phenomenon occurs in spite of the fact that flash photographing is being performed.

Figure 2:
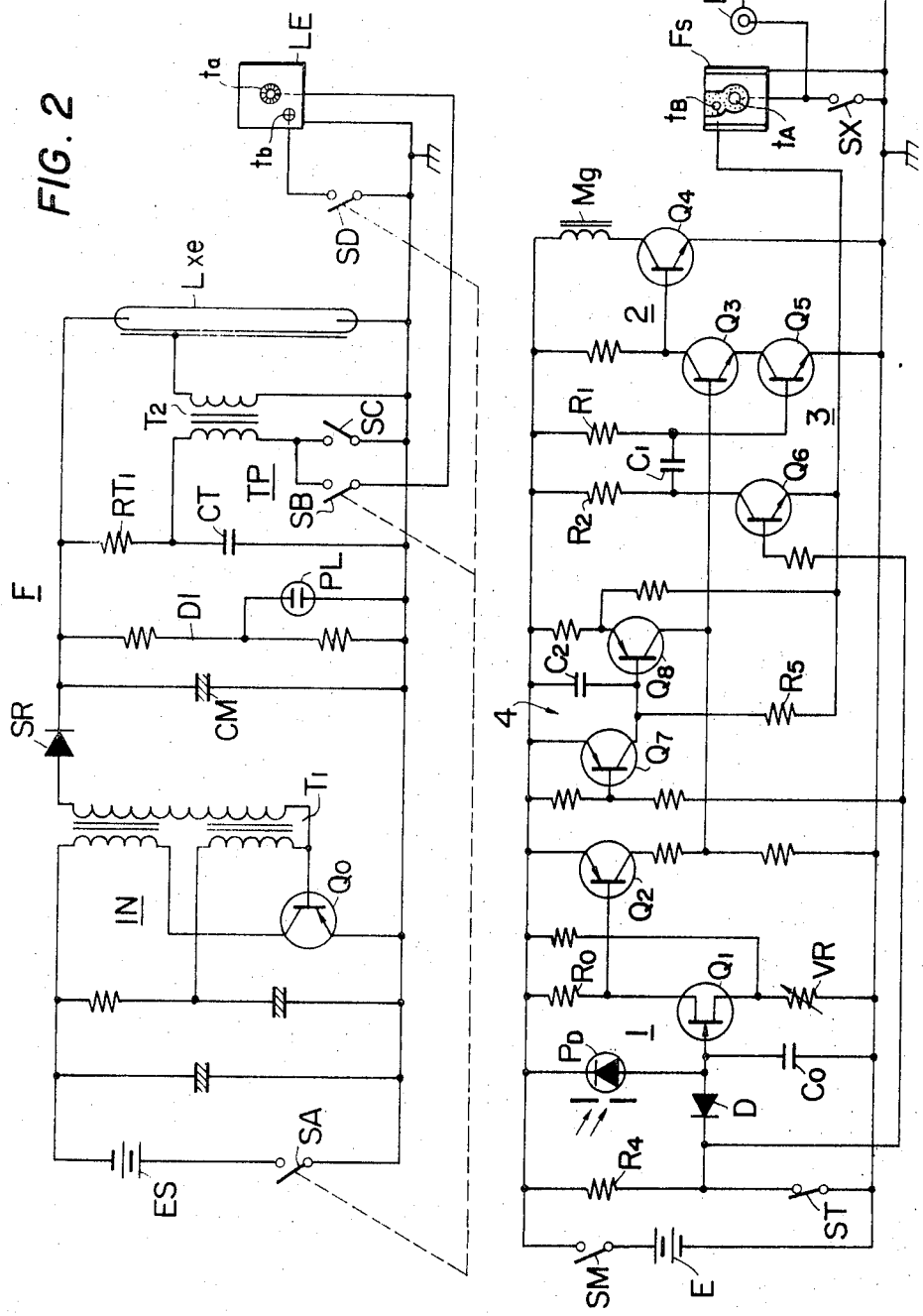
FIG. 2 shows a circuit diagram illustrating another embodiment of the electronic shutter means according to the present invention.

Now, referring to FIG. 2, another embodiment of the present invention is described below. In FIG. 2, the same numerals and reference symbols are given to those parts which are same as those shown in FIG. 1 and the repeated explanation is omitted.

This embodiment is arranged so that said time limiting circuits 3 and 4 automatically become operable when the flash gun, with the power switch SA being turned ON, is mounted to the camera and it automatically becomes possible to carry out the above-mentioned flash photographing without separately operating the switch $S_1$ for flash photographing as in the case of the above-mentioned embodiment. For this purpose, the flash shoe FS is provided with a contact $t_A$ at the center and a contact $t_B$ at a position near the contact $t_A$. Said contacts $t_A$ and $t_B$ are electrically insulated from each other. Said shoe FS is directly connected to the negative pole terminal of said direct current power source E. Said contact $t_A$ is connected to said negative pole terminal of the power source E through said X-contact SX. Said contact $t_B$ is connected directly to the emitter of the transistor $Q_6$ of the time limiting circuit 3 and is also connected to the base of the transistor $Q_8$ of the other time limiting circuit 4 through the resistor $R_5$. On the other hand, for the flash gun F, a contact $t_a$ connectable to said contact $t_A$ is provided at the center of the mounting leg LE, and a contact $t_b$ connectable to said contact $t_B$ is provided at a position near said contact $t_a$. Said contact $t_a$ is connected, through the switch SB, to the connecting point of the primary winding of the pulse transformer $T_2$ in said trigger pulse generating circuit TP and the switch SC. Besides, said mounting shoe LE is directly connected to the grounding line, which is connected to the positive pole terminal of said direct current power source ES through the power switch SA. At the same time, said contact $t_b$ is connected to said grounding line through the swich SD which co-operates with said power switch SA. In FIG. 2, reference symbol EXP designates a synchro-terminal connected in parallel to said X-contact SX.

Therefore, when the mounting leg LE is mounted to the shoe FS provided to the camera body and the power switch SA is turned ON in FIG. 2, the switch SD is also closed co-operating with said switch SA. Thus, time limiting circuits 3 and 4 are respectively connected to the negative pole terminal of said power source E through the contact $t_b$ of the shoe FS, contact $t_B$ of the mounting leg LE, switch SD, mounting leg LE and shoe FS. So, it automatically becomes to the same condition as the case when the switch $S_1$ is turned on in the above-mentioned embodiment. Consequently, according to the embodiment shown in FIG. 2, it is possible to eliminate a failure in photographing which may be caused by forgetting to turn on the switch $S_1$ for synchronized flashlight photographing that is likely to occur in the case of the embodiment shown in FIG. 1.

We claim:

1. An electronic shutter means for a photographic camera comprising a light measuring circuit capable of determining the exposure time, a switching circuit connected to said light measuring circuit, a shutter operating circuit connected to said switching circuit, a first time limiting circuit connected to said switching circuit and provided for the purpose of limiting the maximum shutter speed required for achieving perfect synchronization in flash photographing and a second time limiting circuit connected to said switching circuit and provided for the purpose of limiting the minimum shutter speed for preventing camera-shake phenomenon, said electronic shutter means for a photographic camera being arranged to limit the shutter speed corresponding to the exposure time decided by said light measuring circuit to a value within the range between two kinds of shutter speeds defined by said first and second time limiting circuits.

2. An electronic shutter means for a photographic camera according to the claim 1 further comprising a switch for changing over said first and second time limiting circuits from inactive condition to active condition.

3. An electronic shutter means for a photographic camera according to the claim 1 further comprising a shoe connected to said first and second time limiting circuits and engageable with the mounting leg provided to the flash gun, said first and second time limiting circuits being arranged to become operable condition when said mounting leg is mounted on said shoe.

* * * * *